(No Model.) 2 Sheets—Sheet 1.

P. STOERGER.
PUG MILL.

No. 440,971. Patented Nov. 18, 1890.

WITNESSES:
Chas. Nida
C. Sedgwick

INVENTOR:
P. Stoerger
BY Munn & Co.
ATTORNEYS (No Model.) 2 Sheets—Sheet 2.
P. STOERGER.
PUG MILL.
No. 440,971. Patented Nov. 18, 1890.
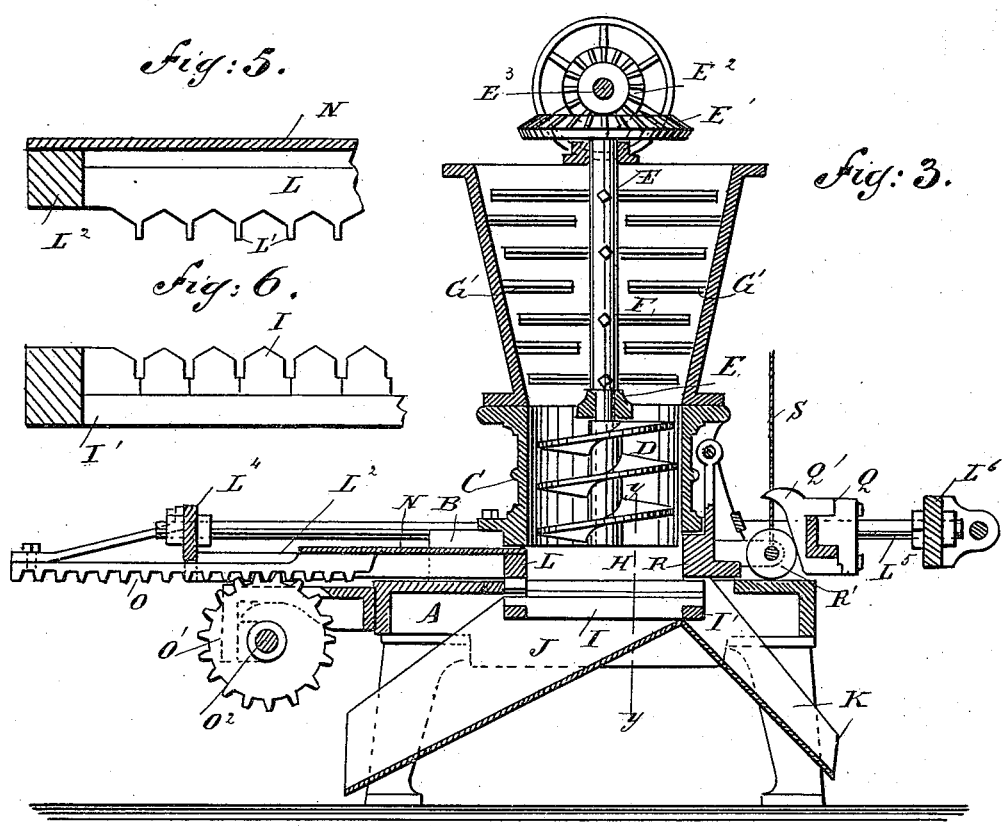
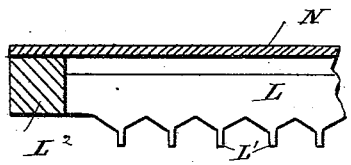
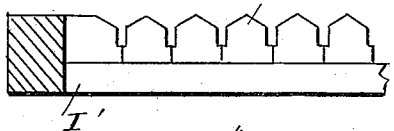
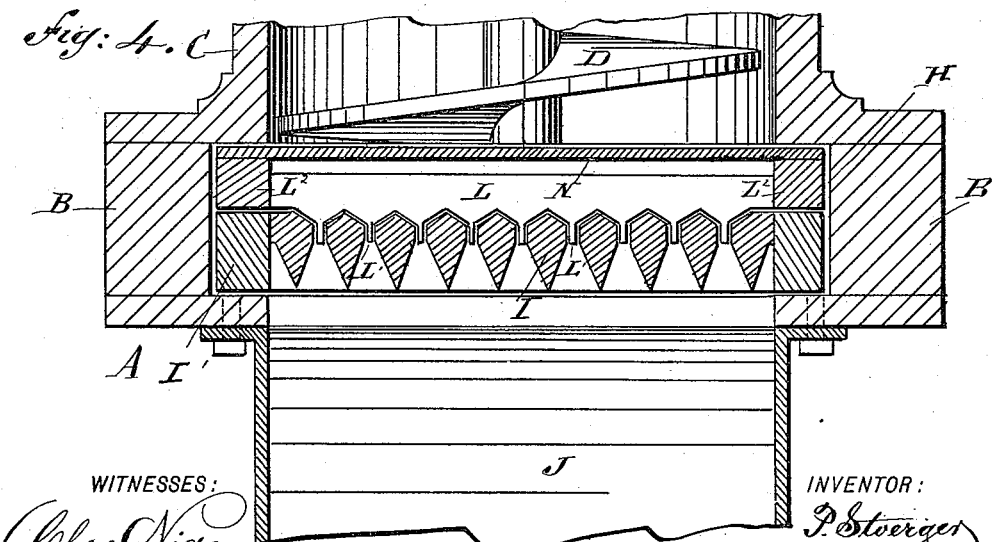
WITNESSES:
Chas. Nida
C. Sedgwick
INVENTOR:
P. Stoerger
BY
Munn & Co.
ATTORNEYS

UNITED STATES PATENT OFFICE.

PAUL STOERGER, OF CHICAGO, ILLINOIS.

PUG-MILL.

SPECIFICATION forming part of Letters Patent No. 440,971, dated November 18, 1890.

Application filed April 12, 1890. Serial No. 347,599. (No model.)

*To all whom it may concern:*

Be it known that I, PAUL STOERGER, of Chicago, in the county of Cook and State of Illinois, have invented a new and Improved Pug-Mill, of which the following is a full, clear, and exact description.

The object of the invention is to provide a new and improved pug-mill which is simple and durable in construction, very effective in operation, and specially designed to remove all stones or lumpy matter which may pass the feed-screw, so as to produce a clay of a very high quality for making first-class bricks, tiles, &c.

The invention consists of grate-bars onto which discharges the feed-screw to press the fine material through the spaces between the grate-bars, while the stones and other lumps remain on the top of the said grate-bars.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1:
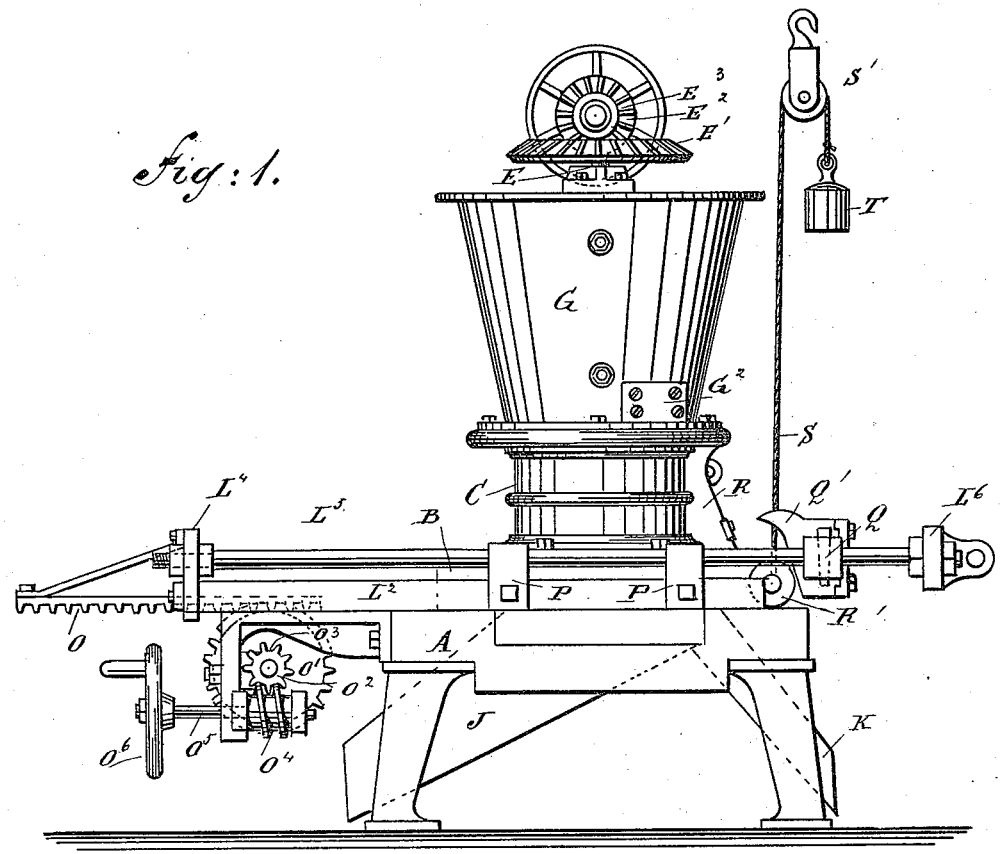
Figure 2:
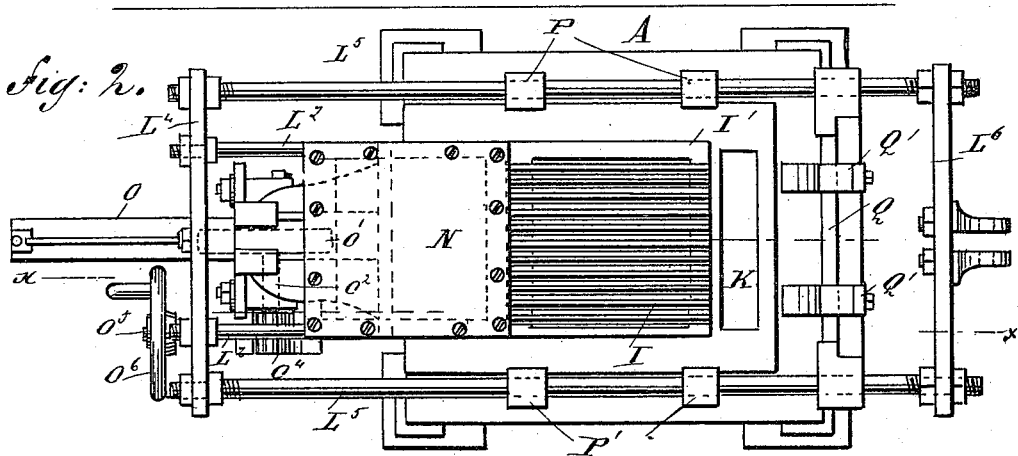

Figure 1 is a side elevation of the improvement. Fig. 2 is a plan view of the same with the feed-screw and casing removed. Fig. 3 is a sectional side elevation of the improvement on the line $x\,x$ of Fig. 2. Fig. 4 is an enlarged transverse section of part of the improvement on the line $y\,y$ of Fig. 3, with the scraper in position. Fig. 5 is an enlarged transverse section of the scraper and its covering-plate, and Fig. 6 is a transverse section of the grate-bar frame with some of the grates in position.

The improved pug-mill is provided with a suitably-constructed frame A, on the bed-plate of which are arranged the two longitudinally-extending blocks B, supporting the feed-screw casing C, in which operates the feed-screw D, secured on a vertically-extending shaft E, also passing into the hopper G, containing the usual stationary arms G', between which pass the arms F, secured on the said shaft E. The latter is provided on its upper end with a bevel gear-wheel E', meshing in the gear-wheel $E^2$, secured on the driving-shaft $E^3$, connected with suitable machinery, so as to impart a rotary motion to the shaft E to actuate the arms F and the feed-screw D in the usual manner.

Below the feed-screw D and its casing C is formed between the blocks B the chamber H, the bottom of which is formed by longitudinally-extending grate-bars I, preferably of the cross-section shown in Fig. 4, the grate-bars being supported in a suitable frame I', held on the top of the bed-plate of the main frame A, as is plainly shown in Fig. 4. The tops of the grate-bars I are slightly beveled, as is plainly shown in Fig. 4, and similar bevels are formed on the under side of the grate-bars, which are placed a suitable distance apart to permit the clay to pass through the grate-bars into a chute J, leading to one end of the machine, as is plainly shown in Figs. 1 and 3. The rear end of the frame I' of the grate-bars I discharges onto the chute K, extending in an opposite direction from the chute J and opening near the rear end of the machine. On the tops of the grate-bars I is adapted to slide a scraper L, having its under side arranged with V-shaped notches fitting onto the correspondingly-shaped bevels on top of the grate-bars, the said scraper being also provided between the said V-shaped notches with downwardly-extending lugs L', adapted to pass between the grate-bars, as is plainly shown in Fig. 4. The scraper L extends transversely, and is secured at its ends to longitudinally-extending side bars $L^2$, which support a cover-plate N, adapted to close the lower end of the feed-screw casing C when the scraper L is passed through the chamber H over the grate-bars I, as hereinafter more fully described.

To the under side of the cover-plate N or to the frame of the scraper L is secured a longitudinally-extending rack O, in mesh with a gear-wheel O', secured on a transversely-extending shaft $O^2$, mounted to turn in suitable bearings arranged on the main frame A. On one end of the shaft $O^2$ is secured a worm-wheel $O^3$, in mesh with a worm $O^4$, secured on a longitudinally-extending shaft $O^5$, mounted to turn in suitable bearings secured on the main frame A. On the outer end of the shaft $O^5$ is fastened a hand-wheel $O^6$, which, when turned, imparts a rotary motion to the shaft $O^5$, which by the worm $O^4$ and the worm-wheel O³ imparts a similar motion to the shaft O², which by the gear-wheel O' imparts a longitudinal sliding movement to the rack O, so as to move the scraper L and the cover-plate N forward or backward, according to the direction in which the hand-wheel O⁶ is turned.

The means just described are specially intended to actuate the scraper L by hand; but in order to operate the same by other suitable power I preferably connect the side bars L² with each other by a transverse beam L⁴, connected by rods L⁵ with another transverse beam L⁶, connected by suitable means with suitable machinery to impart a reciprocating movement to the scraper L. The longitudinally-extending bars L⁵ are mounted to slide in suitable bearings P, fastened to the top of the bed-plate of the main frame. The bars L⁵ are also connected with each other near the transverse beam L⁵ with a beam Q, supporting one or two fixed cams Q', adapted to press on friction-rollers R', mounted to turn in suitable bearings secured on the outside of a door R, forming part of the casing C and extending sufficiently downward to also form the rear end of the chamber H, being pivoted to the feed-screw casing C. A rope S is connected with one of the bearings for the friction-rollers R' and extends upward and passes over a pulley S' and supports a weight T, so that the door R opens automatically the moment the cams Q' slide away from the friction-rollers R'.

The operation is as follows: The material is introduced in the usual manner into the hopper G and is acted on by the arms F and G', and pressed by the feed-screw D into the chamber H, the scraper L being then in its outermost position at one end of the chamber H, opposite the closed door R. The latter is held locked by the cams Q'. The material passing into the chamber H is pressed downward onto and through the spaces between the several grate-bars I, which spaces are only such distances apart as to permit the finer parts of the clay to pass into the chute J, while stones and other lumpy matter remain on the top of the grate-bars. When the operator desires to remove the stones and other lumpy matter from the top of the grate-bars, then the scraper L is moved forward, at which time the door R opens automatically on account of the cams Q' moving forward on the scraper L. The latter in passing over the top of the grate-bars pushes all impurities over the ends of the grate-bars into the chute K, so that the impurities are removed from the machine. It will be seen that any material which may have clogged between two grate-bars is removed by the lugs L', projecting from the scraper L into the spaces between the grate-bars. It will further be seen that when the scraper L moves forward the cover-plate N closes part of the lower end of the casing C, so that the material held in the latter cannot pass into the chamber H until the scraper is returned to its normal position. (Shown in Fig. 3.) The material in the casing C can pass out through the open door R while the scraper is cleaning the grate-bars, the material wasted being but a small amount. When the scraper L is returned into the position shown in Fig. 3, the cams Q', acting on the friction-rollers R', again close and lock the door R.

Having thus fully described my invention, I claim as new and desire to secure by Letters Patent—

1. In a pug-mill, the combination, with grate-bars onto which discharges the feed-screw to press the fine material through the spaces between the grate-bars while the stones and other lumpy matter remain on top of the grate-bars, of a scraper adapted to pass over the said grate-bars to remove the stones or lumpy matter from the same, substantially as shown and described.

2. In a pug-mill, the combination, with a chamber, of grate-bars arranged in the bottom of the same and extending longitudinally, a chute extending from the rear end of the said grate-bars, and a scraper adapted to pass over the said grate-bars to discharge impurities into the said chute, substantially as shown and described.

3. In a pug-mill, the combination, with a chamber, of grate-bars arranged in the bottom of the same and extending longitudinally, a chute extending from the rear end of the said grate-bars, a scraper adapted to pass over the said grate-bars to discharge impurities into the said chute, and a hinged door adapted to close one end of the said chamber opposite the said scraper, substantially as shown and described.

4. In a pug-mill, the combination, with a chamber having a hinged door adapted to close one end of the chamber, of grate-bars arranged in the bottom of the said chamber, and a reciprocating scraper adapted to hold the said door closed when withdrawn from the chamber, substantially as described.

5. In a pug-mill, the combination, with a feed-screw and a feed-screw casing, of a chamber arranged below the said feed-screw casing and into which discharges the said feed-screw, grate-bars arranged in the bottom of the said chamber and through which the fine material is pressed by the action of the said feed-screw while the coarser material remains on top of the grate-bars, and a scraper fitted to slide on top of the said grate-bars and provided with downwardly-extending lugs passing into the spaces between the several grate-bars, substantially as shown and described.

6. In a pug-mill, the combination, with a feed-screw and a feed-screw casing, of a chamber arranged below the said feed-screw casing and into which discharges the said feed-screw, grate-bars arranged in the bottom of the said chamber and through which the fine material is pressed by the action of the said feed-screw, while the coarser material remains on top of the grate-bars, a scraper fitted to slide on top of the said grate-bars and provided with downwardly-extending lugs passing into the spaces between the several grate-bars, a hinged door forming one end of the said chambers opposite the said scraper, and a chute arranged below the said door at the end of the said grate-bars, substantially as shown and described.

7. In a pug-mill, the combination, with a feed-screw and a feed-screw casing, of a chamber arranged below the said feed-screw casing and into which discharges the said feed-screw, grate-bars arranged in the bottom of the said chamber and through which the fine material is pressed by the action of the said feed-screw, while the coarser material remains on top of the grate-bars, a scraper fitted to slide on top of the said grate-bars and provided with downwardly-extending lugs passing into the spaces between the several grate-bars, a hinged and counterbalanced door forming one end of the said chambers opposite the said scraper, a chute arranged below the said door at the end of the said grate-bars, and cams carried by the scraper and adapted to engage the door to close it, substantially as shown and described.

8. In a pug-mill, the combination, with the feed-screw casing, a chamber below the same, and grate-bars in said chamber, of a reciprocating scraper and a plate secured to the scraper and adapted to close the lower end of the feed-screw casing, substantially as and for the purpose set forth.

9. In a pug-mill, the combination of beveled grate-bars arranged below the feed-screw, and a reciprocating scraper having V-shaped notches and downwardly-extending lugs between the notches, substantially as described.

10. In a pug-mill, the combination, with the feed-screw casing having a hinged and counterbalanced door and grate-bars arranged below the casing, of a reciprocating frame, a scraper carried by the frame, and cams carried by the frame for holding the door of the said casing closed, substantially as herein shown and described.

PAUL STOERGER.

Witnesses:
JOHN C. HERRMANN,
RICH. AKERMAN.